(12) United States Patent
Halkosaari et al.

(10) Patent No.: US 7,069,063 B2
(45) Date of Patent: Jun. 27, 2006

(54) USER CHANGEABLE MOBILE PHONE COVER

(75) Inventors: Heikke Halkosaari, Paimio (FI); Mikko Laaksonen, San Diego, CA (US); Mikko Laitinen, Halikko (FI); Jarmo Lehtonen, Florence (IT); Juoko Pirila, Turku (FI)

(73) Assignee: Nokia Mobile Phones Limited, Espoo (FI)

( * ) Notice: Subject to any disclaimer, the term of this patent is extended or adjusted under 35 U.S.C. 154(b) by 293 days.

(21) Appl. No.: 09/884,639

(22) Filed: Jun. 19, 2001

(65) Prior Publication Data

US 2002/0193136 A1 Dec. 19, 2002

(51) Int. Cl.
*H04M 1/00* (2006.01)

(52) U.S. Cl. .............. 455/575.8; 455/550.1; 455/575.1; 455/90.3; 455/347; 379/433.11; 379/433.01; 379/428.01; 379/433.12; 200/302.1

(58) Field of Classification Search ........... 455/550.1, 455/90.1, 90.2, 90.3, 575.1, 575.4, 575.8, 455/556.1, 556.2, 128, 575.6, 100, 347, 348, 455/349; 379/433.01, 433.11, 433.12, 433.13, 379/437, 440, 445, 447, 428.01; D14/137, D14/138; 361/814
See application file for complete search history.

(56) References Cited

U.S. PATENT DOCUMENTS

| 2,439,408 | A | | 4/1948 | Mitchell | |
|---|---|---|---|---|---|
| 4,397,035 | A | * | 8/1983 | Nothnagel et al. | 455/90.3 |
| 4,584,718 | A | * | 4/1986 | Fuller | 455/351 |
| 5,025,921 | A | | 6/1991 | Gasparaitis et al. | 206/320 |
| 5,241,592 | A | * | 8/1993 | Carlson et al. | 379/433.11 |
| 5,526,526 | A | * | 6/1996 | Clark et al. | 455/90.3 |
| 5,625,688 | A | | 4/1997 | Ford et al. | 379/433 |
| 5,818,924 | A | | 10/1998 | King et al. | 379/389 |
| 5,848,152 | A | * | 12/1998 | Slipy et al. | 379/433.13 |
| 5,896,453 | A | | 4/1999 | Speaks | 379/433 |
| 5,956,625 | A | | 9/1999 | Hansen et al. | 455/90 |
| 5,960,332 | A | | 9/1999 | Michalzik | 455/90 |
| 6,068,119 | A | | 5/2000 | Derr et al. | 206/305 |
| 6,078,792 | A | | 6/2000 | Phillips | 455/90 |
| 6,082,535 | A | * | 7/2000 | Mitchell | 206/320 |
| 6,092,707 | A | | 7/2000 | Bowes, Jr. | 224/435 |
| 6,130,945 | A | | 10/2000 | Shin | 379/455 |
| 6,151,485 | A | | 11/2000 | Crisp | 455/90 |
| 6,349,824 | B1 | * | 2/2002 | Yamada | 206/316.1 |
| 6,467,683 | B1 | * | 10/2002 | Jun | 235/145 R |
| 6,594,472 | B1 | * | 7/2003 | Curtis et al. | 455/575.8 |

FOREIGN PATENT DOCUMENTS

| JP | 11216010 A | * | 8/1999 |
|---|---|---|---|
| JP | 2000069536 A | * | 3/2000 |
| WO | WO 97/03511 | | 1/1997 |
| WO | WO 00/51315 | | 8/2000 |
| WO | WO 01/03468 A2 | | 1/2001 |

* cited by examiner

*Primary Examiner*—Marsha D. Banks-Harold
*Assistant Examiner*—Willie J. Daniel, Jr.
(74) *Attorney, Agent, or Firm*—Perman & Green, LLP

(57) ABSTRACT

A cordless telephone handset. The cordless telephone handset has telephone circuitry with a front side. The front side of the telephone circuitry has a top end and a bottom end. A housing is provided having a top shell and a bottom shell where the top shell and the bottom shell are disconnectable. The housing is adapted to substantially enclose the telephone circuitry when the top shell and the bottom shell are mated in a direction from the top end to the bottom end of the telephone circuitry.

22 Claims, 4 Drawing Sheets

USER CHANGEABLE MOBILE PHONE COVER

BACKGROUND OF THE INVENTION

1. Field of the Invention

The present invention relates to a mobile phone and, more particularly, to a user changeable cover for a mobile phone.

2. Prior Art

Many different covering devices are known in the mobile phone art. For example, U.S. Pat. No. 6,078,792 discloses a water exposure protected mobile radio communication device where the electronic components within the phones housing are protected by absorbent packing disposed around the keys. Cellular telephones typically include a housing having a front cover and a back cover. The front cover generally includes the user interface, such as a keypad, microphone, speaker, keypad and display. The typical scheme where there is a front and back cover makes it difficult to accommodate fasteners in the event the cover is to be user changeable. In addition, when there is a desire to seal between a front and rear cover, the seal becomes large and requires multiple fasteners to effectively maintain the seal against water or moisture. Accordingly, there is a desire to provide a user changeable cover for a mobile phone which is easily changed and can easily accommodate waterproofing.

SUMMARY OF THE INVENTION

In accordance with one embodiment of the present invention, a cordless telephone handset is provided. The cordless telephone handset has telephone circuitry with a front side. The front side of the telephone circuitry has a top end and a bottom end. A housing is provided having a top shell and a bottom shell where the top shell and the bottom shell are disconnectable. The housing is adapted to substantially enclose the telephone circuitry when the top shell and the bottom shell are mated in a direction from the top end to the bottom end of the telephone circuitry.

In accordance with another embodiment of the present invention, a waterproof cordless telephone handset is provided. The waterproof cordless telephone handset has a housing having a first shell and a second shell. The first shell and the second shell are disconnectable by the cordless telephone user. A seal is disposed between the first shell and the second shell where the seal isolates the telephone circuitry within the housing from water outside the housing. The housing is adapted to be interchangeable with a second changeable housing that can be changeable by the cordless telephone user.

In accordance a method of the present invention, a method of assembling a cordless telephone handset is provided having a first step of providing telephone circuitry having a front side where the front side has a top end and a bottom end. A housing is then provided having a top shell and a bottom shell where the top shell and the bottom shell are disconnectable. The top shell and the bottom shell are then mated over the telephone circuitry in a direction from the top end to the bottom end of the telephone circuitry.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
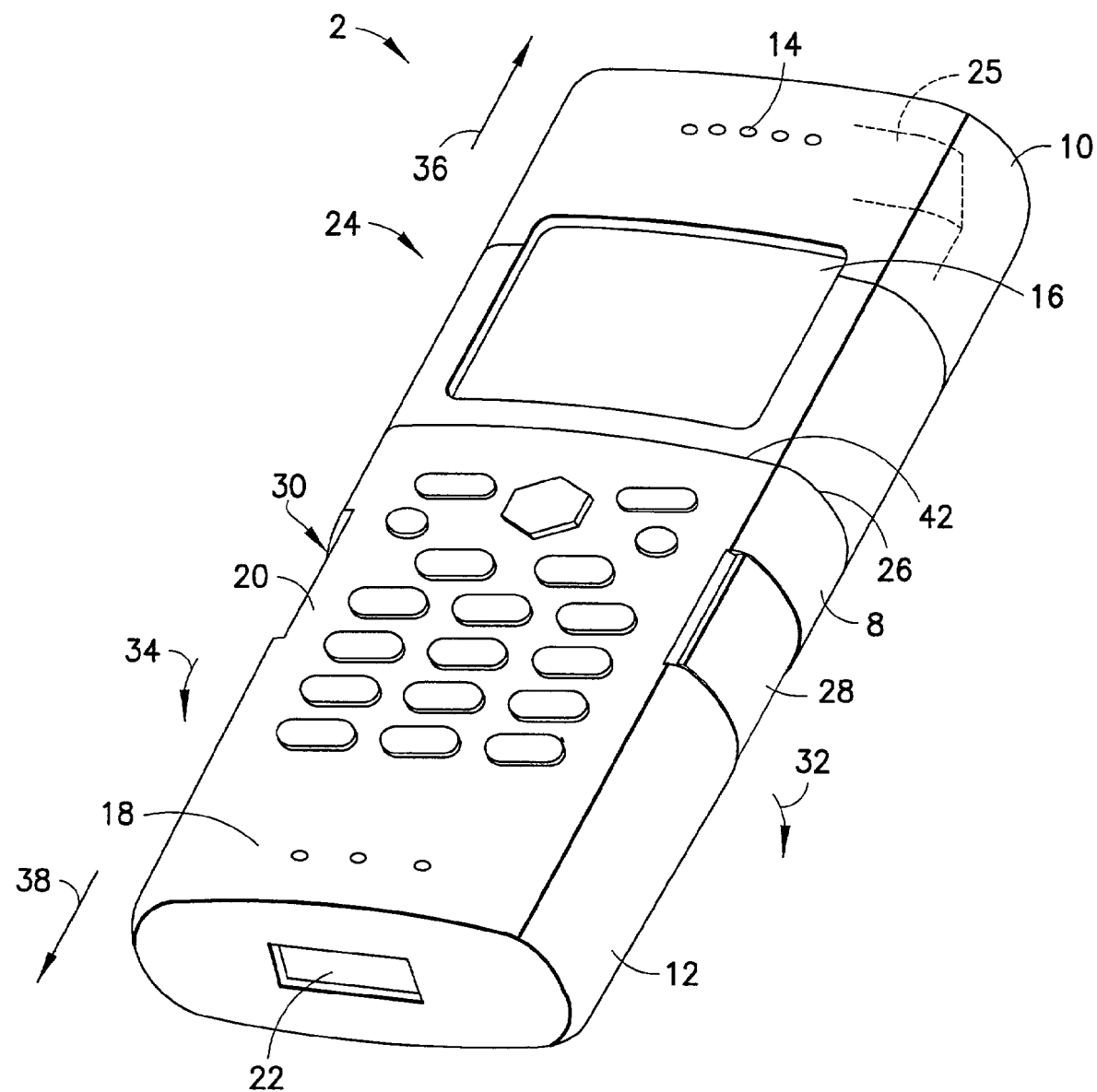
FIG. 1 is an isometric view of a first embodiment cordless telephone handset incorporating features of the present invention.

Referring to FIG. 1, there is shown, a view of a first embodiment cordless telephone handset 2 incorporating features of the present invention. Although the present invention will be described with reference to the two embodiments shown in the drawings, it should be understood that the present invention can be embodied in many alternate forms of embodiments. In addition, any suitable size, shape or type of elements or materials could be used.

Cordless telephone handset 2, in the embodiment shown, is a mobile cellular communication device. However, in alternate embodiments, the apparatus could be a mobile radio communications device, a cordless telephone device or other suitable device. Cordless telephone handset 2 generally comprises housing 8 having a top cover or shell 10 and a bottom cover or shell 12 with user interface 24. The top shell 10 of the phone 2 typically contains a speaker interface 14 and a display interface 16. The bottom shell 12 of the phone 2 typically contains a microphone interface 18, a keypad interface 20 and a power interface 22. Telephone circuitry 25 is contained within housing 8. The telephone circuitry 25 may include transmit and receive circuitry for radio communications, audio processing circuits for coding and decoding voice communications, and a control circuit for controlling the operation of the cellular phone. The telephone circuitry is protected by housing 8 from exposure or water entry which might cause damage to the electronic circuits. The description above is merely intended to be exemplary. More or less features could also be provided. For example, an antenna or a battery may be disposed within or outside of housing 8. As a further example, telephone circuitry 25 may be a cordless communication device that includes interfaces and a cover independently operable with or without housing 8, and that may be operated with or without housing 8, as in the case where housing 8 is used to waterproof the cordless communication device. As further examples, features such as belt clips, headset connections, docking interfaces, status indicators, lanyard connections, labels, network connections, recording capability, additional user interfaces, or otherwise may be provided.

Top shell 10 and bottom shell 12 are disconnectable at parting line 26. Although parting line 26 is shown as a flat interface between top shell 10 and bottom shell 12, other suitable surfaces or shapes could be used or devised by those skilled in the art without departing from the invention. Although parting line 26 is shown between keypad interface 20 and display interface 16, this position is intended to be exemplary and various alternative locations and modifications can be devised by those skilled in the art without departing from the invention. Such an alternative would be for example, locating parting line 26 above or below keypad interface 20 or display interface 16. Parting line 26 may incorporate a seal 42 in order to isolate the interior of housing 8 from the exterior of housing 8 for the purpose of excluding water or other contaminants. By having parting line 26 between the top and bottom of telephone circuitry 25, the circumference and surface area to be sealed is minimized as compared to prior art housings where the parting line was between the front and back of the telephone circuitry. Additionally, seal 42 may be held with fewer fasteners because the housing 8 is stiffer, more dimensionally stable and less likely to creep or deform along parting line 26 as compared to prior art housings where the parting line was between the front and back of the telephone circuitry.

Fasteners 28 and 30 are used to removeably couple top shell 10 and bottom shell 12 to each other. Although two fasteners 28 and 30 are shown, more or less fasteners could be provided. In order to remove telephone circuitry 25 from housing 8, fasteners 28 and 30 are rotated in directions 32 and 34 respectively. The phone user may rotate fasteners 28 and 30 without the use of tools in the embodiment shown. This allows the user to easily change housing 8 with a second changeable housing in order to change the color, appearance, features or other characteristics of the cordless telephone handset 2. After fasteners 28 and 30 are rotated in directions 32 and 34 respectively, top shell 10 and bottom shell 12 may be removed in directions 36 and 38 respectively in order to expose telephone circuitry 25. Replacement of top shell 10 and bottom shell 12 (or alternately a second changeable shell) is accomplished by sliding top shell 10 and bottom shell 12 over telephone circuitry 25 opposite of directions 36 and 38 respectively. Fasteners 28 and 30 may then be rotated opposite of directions 32 and 34 respectively in order to couple top shell 10 to bottom shell 12. In this manner, housing 8 may easily be removed and replaced or removed and replaced with a second changeable housing by the phone user.

Figure 2:
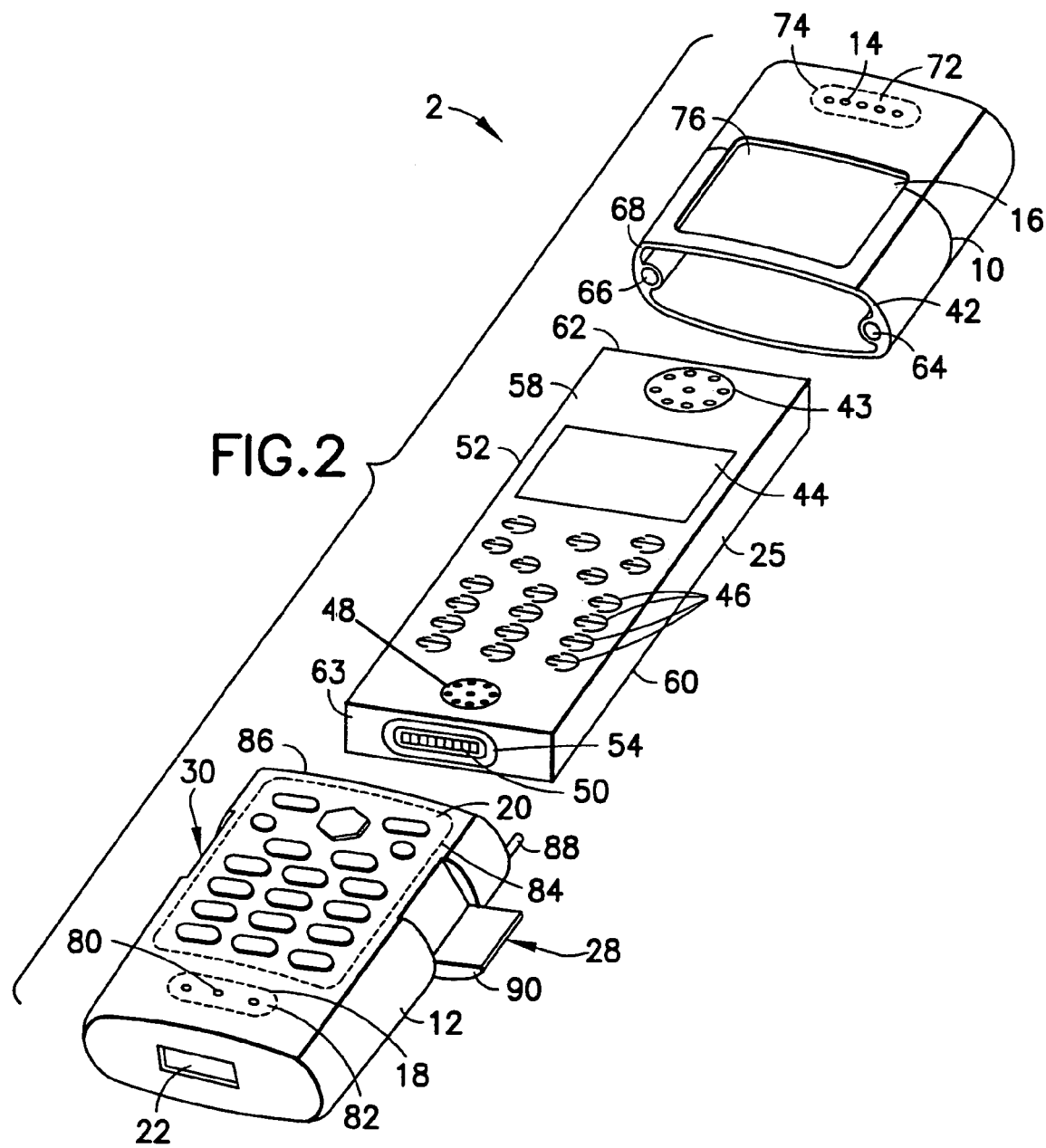
FIG. 2 is an exploded isometric view of a first embodiment cordless telephone handset incorporating features of the present invention.

Referring now also to FIG. 2 there is shown an exploded view of the first embodiment cordless telephone handset 2 incorporating features of the present invention. Cordless telephone handset 2 is shown with telephone circuitry 25 exposed after top shell 10 and bottom shell 12 of housing 8 has been separated. Housing 8 has a top shell 10 and a bottom shell 12.

Telephone circuitry 25 is contained within housing 8 when top shell 10 and bottom shell 12 are coupled. Telephone circuitry 25 has a front 58, a back 60, a top 62 and a bottom 63 as shown. The telephone circuitry 25 may include circuitry 52 such as transmit and receive circuitry for radio communications, audio processing circuits for coding and decoding voice communications, and a control circuit for controlling the operation of the cellular phone. More or less circuitry or features could be provided. The telephone circuitry 25 may further include a speaker 43, a display 44, keypad contacts 46, a microphone 48 and a power interface 50. Telephone circuitry 25 is shown as a single arrangement. More or less circuit arrangements may be provided without departing from the invention. Speaker 43 may allow the user to hear communications from third parties and may be used as a tone or sound indicator to determine that a key has been pressed or to indicate a status condition such as weak signal, busy signal or otherwise. Display 44 may allow the user to see phone status such as number called, date, directory or may alternately act as a interface for text or images such as for mail or internet communications or otherwise. Keypad contacts 46 interface with keypad interface 20 allowing the user to input numbers or data. Keypad contacts 46 are shown as being exemplary and may alternately be touch contacts such as electrostatic or optical contacts or otherwise without departing from the invention. Microphone 48 is provided to allow the user to speak or enter sound. Power interface 50 is provided with seal 54. Exemplary power interface 50 is shown as a contact based interface but may alternately be a inductive based power interface, optical based power interface or otherwise. The description above is merely intended to be exemplary. More or less features could also be provided. For example, features such as an antenna, a battery, headset connections, docking interfaces, status indicators, network connections, additional user interfaces, or otherwise may or may not be provided complimenting telephone circuitry 25.

Top shell 10 of the phone 2 may contain speaker interface 14 a display interface 16 and top fastener points 64 and 66. Gasket or seal 42 may be provided on top interfacing surface 68. Top shell 10 is shown as molded polymer plastic shell. Top shell 10 may alternately be made as or from a composite material(s), from metal or other suitable material or method. Speaker interface 14 is shown as having one or more impressions or holes 72 and gasket 74. Gasket 74 is sealed to the interior of top shell 10 and allows sound to penetrate top shell 10. Gasket 74 may prevent water or contaminants from entering the interior of top shell 10. Holes or gasket 74 may be molded as part of top shell 10, may be made from the same material as shell 10 or in an alternate embodiment may not be provided at all. Display interface 16 is shown as a substantially clear port 76. Port 76 may be plastic, glass or other suitable material. Port 76 may be sealed to the interior of top shell 10 and allows light to penetrate top shell 10. Port 76 may prevent water or contaminants from entering the interior of top shell 10 while allowing light to pass through. Port 76 may be molded as part of top shell 10, may be made from the same material as shell 10 or in an alternate embodiment may not be provided at all. Top fastener points 64 and 66 allow fasteners 28 and 30 respectively to couple with top shell 10. Gasket 42 may be provided on top interfacing surface 68 of top shell 10. Gasket 42 may prevent water or contaminants from entering the interior of top shell 10 when it is coupled with bottom shell 12. Gasket or seal 42 isolates the interior of housing 8 from the exterior of housing 8 for the purpose of excluding water or other contaminants. Gasket 42 may be an o-ring type gasket or otherwise. Gasket 42 may be made from a polymer or other material suitable for sealing. Gasket 42 may be molded as part of top shell 10, may be made from the same material as shell 10 or in an alternate embodiment may not be provided at all. The description above is merely intended to be exemplary. More or less features could also be provided. For example, features such as an antenna, a battery, headset connections, docking interfaces, status indicators, network connections, additional user interfaces, or otherwise may or may not be via top shell 10. As a further example, the features accessible via bottom shell 12 may or may not be via top shell 10.

The bottom shell 12 of the phone 2 typically contains a microphone interface 18, a keypad interface 20 and a power interface 22. Bottom shell 12 is shown as molded polymer plastic shell. Bottom shell 12 may alternately be made as or from a composite material(s), from metal or other suitable material or method. Microphone interface 18 is shown as having one or more impressions or holes 80 and gasket 82. Gasket 82 is sealed to the interior of bottom shell 12 and allows sound to penetrate bottom shell 12. Gasket 82 may prevent water or contaminants from entering the interior of bottom shell 12. Holes 80 and gasket 82 may be molded as part of bottom shell 12, may be made from the same material as shell 12 or in an alternate embodiment may not be provided at all. Keypad interface 20 is shown as a unitary flexible polymer structure. Conductive areas on the opposing side of keypad 20 interface with contacts 46 for user input. Keypad 20 may be sealed to the interior of shell 12 at flange 84. Keypad 20 may prevent water or contaminants from entering the interior of shell 12 while allowing user input. Keypad 20 may be molded as part of bottom shell 12, may be made from the same material as bottom shell 12 or in an alternate embodiment may not be provided at all. Fasteners 28 and 30 are provided to interface with fastener points 64 and 66 respectively to allow bottom shell 12 to couple with top shell 10. Fastener 28 includes key 88 and lever 90. Lever 90 is adapted to be rotated using the fingers of the user. Key 88 is formed, molded or inserted into lever 90 such that rotation of lever 90 also rotates key 88. Interfacing surface 86 is provided on bottom shell 12 to interface with gasket 42 and/or interfacing surface 68 of top shell 10. Power interface 22 is provided to allow access to power interface 50. The interior surface of bottom shell 12 interfaces with seal 54 in order to exclude water or contaminants from the interior of housing 8. In the event exemplary power interface 50 is an inductive based power interface, optical based power interface or otherwise, power interface 22 may not be provided. The description above is merely intended to be exemplary. More or less features could also be provided. For example, features such as an antenna, a battery, headset connections, docking interfaces, status indicators, network connections, additional user interfaces, or otherwise may or may not be via bottom shell 12. As a further example, the features accessible via top shell 10 may or may not be via bottom shell 12.

Figure 3:
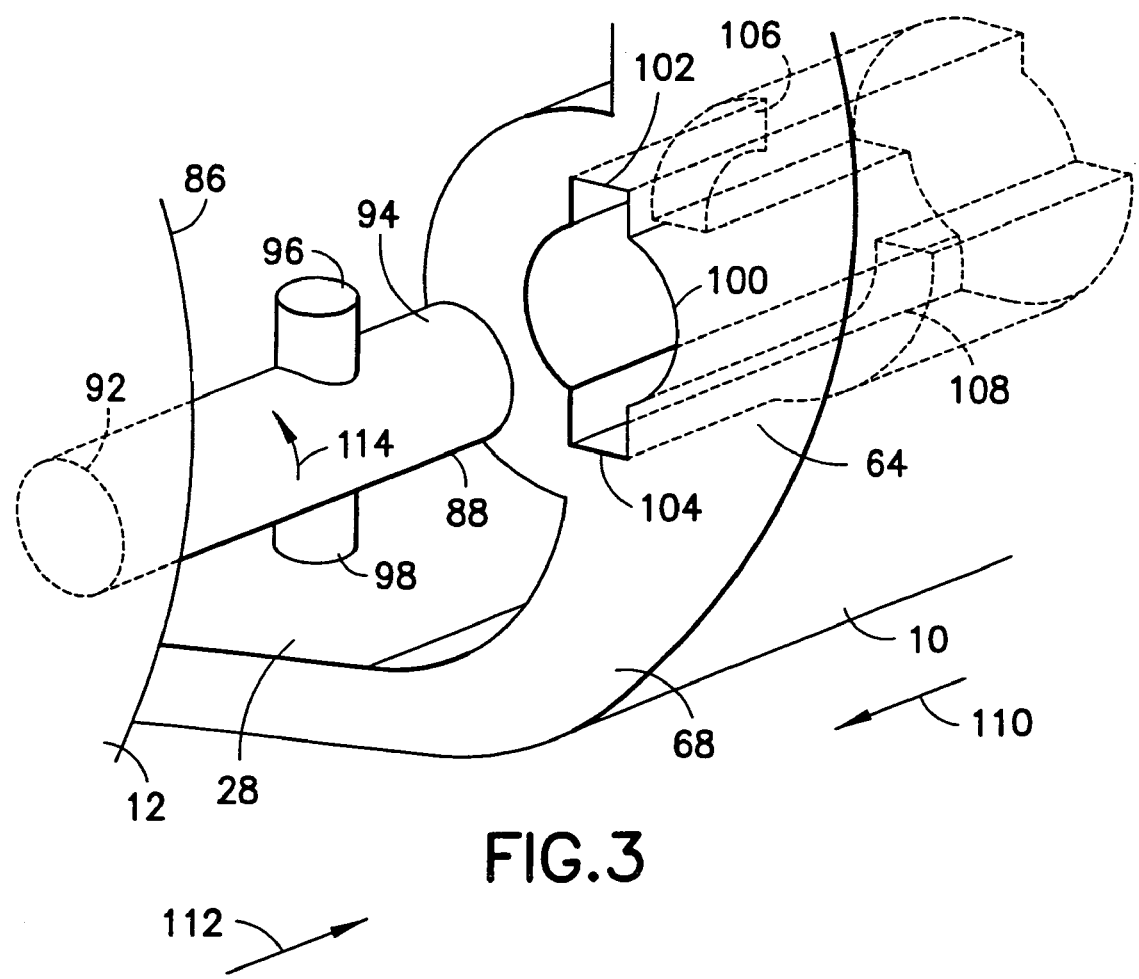
FIG. 3 is an isometric view of a rotateable key type fastener incorporating features of the present invention.

Referring now also to FIG. 3 there is shown an isometric view of a rotatable key type fastener 28 incorporating features of the present invention. Key type fastener 28 has a key 88 that rotates within bore 92 of bottom shell 12. Key 88 has a shaft 94 and pins 96 and 98. Key 88 is sized to be accepted and locked within fastener point 64 of top shell 10. Fastener point 64 has bore 100, slots 102 and 104, and recesses 106 and 108. In order to couple top shell 10 to bottom shell 12, top shell 10 and bottom shell 12 are joined in directions 110 and 112 respectively. When top shell 10 and bottom shell 12 are joined in directions 110 and 112 respectively, shaft 94 and pins 96 and 98 enter bore 100 and slots 102 and 104 respectively. When surfaces 68 and 86 are proximate each other, key 88 may be rotated in direction 114 using lever 90 (see FIG. 2). When key 88 is rotated in direction 114, pins 96 and 98 engage recesses 106 and 108 respectively, locking and preventing shells 10 and 12 from being separated without rotation of key 88 opposite direction 114. Recesses 106 and 108 may be sloped relative to bore 100 in order to allow shells 10 and 12 to be drawn together upon rotation of key 88 in direction 114. Recesses 106 and 108 may further incorporate an impression or detent such that upon completion of rotation of key 88 in direction 114, the key 88 will hold its position. Key 88 may be spring loaded in direction 110 in order to allow shells 10 and 12 to be drawn together upon rotation of key 88 in direction 114.

Figure 4A:
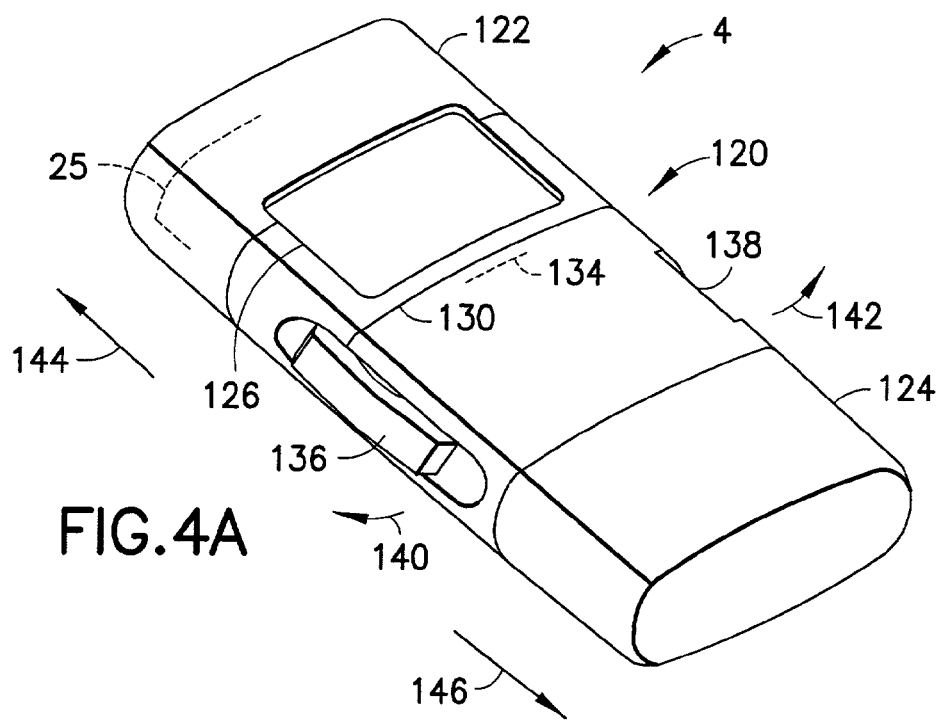
FIG. 4A is an isometric view of a second embodiment cordless telephone handset incorporating features of the present invention.

Referring now also to FIG. 4A, there is shown, a view of a second embodiment cordless telephone handset 4 incorporating features of the present invention. Cordless telephone handset 4 may incorporate cordless telephone features of cordless telephone 2 shown in FIG. 1. Cordless telephone handset 4 generally comprises housing 120 having a top cover or shell 122 and a bottom cover or shell 124 with user interface 126. Telephone circuitry 25 is contained within housing 120. The description above is merely intended to be exemplary. More or less features could also be provided. For example, an antenna or a battery may be disposed within or outside of housing 120. As further examples, features such as belt clips, headset connections, docking interfaces, status indicators, lanyard connections, labels, network connections, recording capability, additional user interfaces, or otherwise may be provided.

Top shell 122 and bottom shell 124 are disconnectable at parting line 130. Although parting line 130 is shown as a flat interface between top shell 122 and bottom shell 124, other suitable surfaces or shapes could be used or devised by those skilled in the art without departing from the invention. Although parting line 130 is shown in a position below user interface 126, this position is intended to be exemplary and various alternative locations and modifications can be devised by those skilled in the art without departing from the invention. Such an alternative would be for example, locating parting line 130 above or below user interface 126. Parting line 130 may incorporate a seal 134 in order to isolate the interior of housing 120 from the exterior of housing 120 for the purpose of excluding water or other contaminants. By having parting line 130 between the top and bottom of telephone circuitry 25, the circumference and surface area to be sealed is minimized as compared to prior art housings where the parting line was between the front and back of the telephone circuitry. Additionally, seal 134 may be held with fewer fasteners because the housing 120 is stiffer, more dimensionally stable and less likely to creep or deform along parting line 130 as compared to prior art housings where the parting line was between the front and back of the telephone circuitry.

Fasteners 136 and 138 are used to removeably couple top shell 122 and bottom shell 124 to each other. Although two fasteners 136 and 138 are shown, more or less fasteners could be provided. In order to remove telephone circuitry 25 from housing 120, fasteners 136 and 138 are rotated in directions 140 and 142 respectively and unlatched from top shell 122. The phone user may rotate fasteners 136 and 138 without the use of tools in the embodiment shown. This allows the user to easily change housing 120 with a second changeable housing, such as housing 8 shown in FIG. 1 in order to change the color, appearance, features or other characteristic of the cordless telephone handset. After fasteners 136 and 138 have been unlatched from top shell 122, top shell 122 and bottom shell 124 may be removed in directions 144 and 146 respectively in order to expose telephone circuitry 25. Replacement of top shell 122 and bottom shell 124 (or alternately a second changeable shell such as housing 8) is accomplished by sliding top shell 122 and bottom shell 124 over telephone circuitry 25 opposite of directions 144 and 146 respectively. Fasteners 136 and 138 may then be latched to top shell 122 in order to couple top shell 122 to bottom shell 124. In this manner, housing 120 may easily be removed and replaced or removed and replaced with a second changeable housing by the phone user.

Figure 4B:
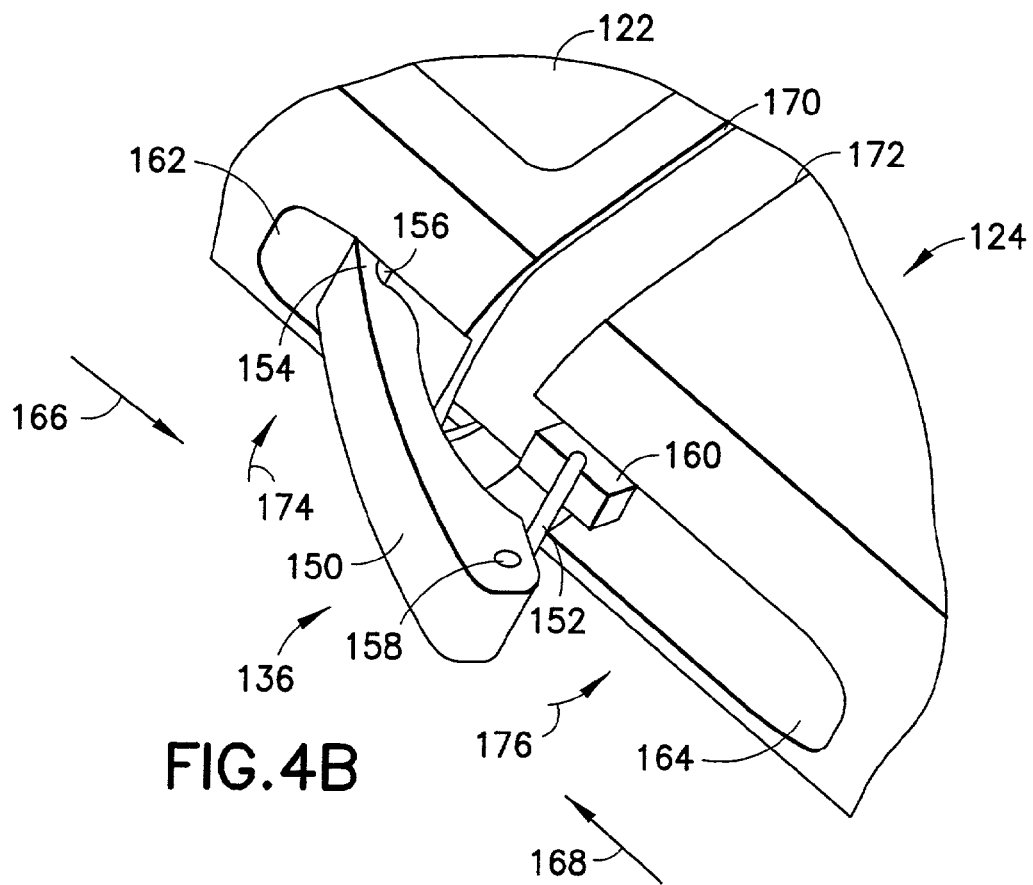
FIG. 4B is an isometric view of a latch type fastener incorporating features of the present invention.

Referring now also to FIG. 4B there is shown an isometric view of a latch type fastener 136 incorporating features of the present invention. Latch type fastener 136 has a latch member 150 and pivot arm 152. Latch member 150 has a hook 154 which engages pin 156 in top shell 122. Latch member 150 is pivotally coupled to pivot arm 152 with pin 158. Pivot arm 152 is pivotally coupled to bottom shell 124 at support 160. Recesses 162 and 164 are formed in top shell 122 and bottom shell 124 respectively such that latch type fastener 136 stays flush or below the outside contour of housing 120 when top shell 122 and bottom shell 124 are coupled. In order to couple top shell 122 to bottom shell 124, top shell 122 and bottom shell 124 are joined in directions 166 and 168 respectively. When surfaces 170 and 172 are proximate each other, latch 150 may be rotated in direction 174 such that hook 154 engages pin 156 in top shell 122. Latch 150 may then be rotated in direction 176 causing pivot arm 152 to prevent shells 122 and 124 from being separated without rotation of latch 150 opposite direction 176. Latch 150 may be rotated in direction 176 until latch 150 snaps into recess 164 of lower shell 124. To unlatch, Latch 150 may be rotated opposite direction 176 until latch 150 snaps out of recess 164 of lower shell 124. Latch 150 may then be rotated opposite direction 174 such that hook 154 disengages pin 156 in top shell 122. Top shell 122 and bottom shell 124 may then be separated.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A mobile communication device comprising:
    telephone circuitry having a front side, the front side of the telephone circuitry having a top end including a speaker and a bottom end including a microphone; and
    a housing having a top shell including a speaker interface and a bottom shell including a microphone interface, the top shell and the bottom shell being disconnectable;
    each interface including a gasket that allows sound penetration while preventing the entry of water and contaminants;
    the bottom shell having a unitary keypad interface sealed to the bottom shell with conductive areas that interface with contacts on the telephone circuitry;
    wherein the housing is adapted to substantially enclose the telephone circuitry when the top shell and the bottom shell are mated in a direction along a length of the telephone circuitry from the top end with the speaker to the bottom end with the microphone, at a parting line perpendicular to the mating direction and arranged such that a circumference and surface area to be sealed between the top and bottom shell is minimized.

2. The mobile communication device of claim 1 further comprising a user interface, the user interface usable by a mobile communication device user on the front side of the telephone circuitry.

3. The mobile communication device of claim 2 wherein the user interface comprises a display, the display viewable by the mobile communication device user through the housing.

4. The mobile communication device of claim 2 wherein the user interface comprises a touch pad, the touch pad interfaced to by the mobile communication device user through the housing.

5. The mobile communication device of claim 1 further comprising a seal between the top shell and the bottom shell, the seal being adapted to isolate the telephone circuitry within the housing from water outside the housing.

6. The mobile communication device of claim 1 wherein the housing is adapted to be interchangeable with a second changeable housing that is changeable by a mobile communication device user.

7. The mobile communication device of claim 6 wherein the second changeable housing has a different predetermined characteristic than the housing.

8. The mobile communication device of claim 1 wherein the housing is adapted to be interchangeable with a second changeable housing that is changeable by a mobile communication device user without the use of a tool.

9. The mobile communication device of claim 1 further comprising at least one fastener, wherein the fastener is adapted to couple the top shell to the bottom shell.

10. The mobile communication device of claim 9 wherein the fastener comprises a latch.

11. The mobile communication device of claim 9 wherein the fastener comprises a rotatable key.

12. A mobile communication device according to claim 1 wherein the device is a cordless telephone handset.

13. A waterproof mobile communication device comprising:
    a housing having a first shell with a speaker interface and a second shell with a microphone interface, the first shell and the second shell being disconnectable by a mobile communication device user toward a top end of telephone circuitry within the housing having a speaker and a bottom end of the telephone circuitry having a microphone, respectively, at a parting line perpendicular to a disconnecting direction and arranged such that a circumference and surface area to be sealed between the first and second shell is minimized,
    the second shell having a unitary keypad interface sealed to the second shell with conductive areas that interface with contacts on the telephone circuitry; and
    a seal between the first shell and the second shell, the seal being adapted to isolate the telephone circuitry within the housing from water outside the housing;
    wherein the housing is adapted to be interchangeable with a second changeable housing that is changeable by the mobile communication device user,
    wherein each interface includes a gasket that allows sound penetration while preventing the entry of water and contaminants.

14. The mobile communication device of claim 13 further comprising a user interface having a display, the display viewable by the mobile communication device user through the housing.

15. The mobile communication device of claim 13 wherein the second changeable housing has a different predetermined characteristic than the housing.

16. The mobile communication device of claim 13 wherein the housing and the second changeable housing can be changeable by the mobile communication device user without the use of a tool.

17. The mobile communication device of claim 13 further comprising at least one fastener, wherein the fastener is adapted to couple the first shell to the second shell.

18. The mobile communication device of claim 17 wherein the fastener comprises a latch.

19. The mobile communication device of claim 17 wherein the fastener comprises a rotatable key.

20. A method of assembling a mobile communication device comprising the steps of:
    providing telephone circuitry having a front side, the front side having a top end including a speaker and a bottom end including a microphone;
    providing a housing having a top shell including a speaker interface and a bottom shell including a microphone interface, the top shell and the bottom shell being disconnectable, each interface including a gasket that allows sound penetration while preventing the entry of water and contaminants;

providing the bottom shell with a unitary keypad interface sealed to the bottom shell with conductive areas that interface with contacts on the telephone circuitry; and mating the top shell and the bottom shell around the telephone circuitry in a direction along a length from the top end with the speaker to the bottom end of the telephone circuitry with the microphone, at a parting line perpendicular to the mating direction and arranged such that a circumference and surface area to be sealed between the top and bottom shell is minimized.

21. The method of assembling a mobile communication device according to claim 20 further comprising the step of connecting the top shell to the bottom shell with a fastener.

22. The method according to claim 20 wherein the mobile communication device comprises a cordless telephone handset.

* * * * *